(12) United States Patent
Cartlidge (10) Patent No.: US 6,815,659 B2
(45) Date of Patent: Nov. 9, 2004

(54) OPTICAL SYSTEM AND METHOD OF MAKING SAME

(75) Inventor: Andrew G. Cartlidge, Palm Beach Gardens, FL (US)

(73) Assignees: Palantyr Research, LLC, Cleveland, OH (US); Angkor Technology, LLP, Cleveland, OH (US)

(*) Notice: Subject to any disclaimer, the term of this patent is extended or adjusted under 35 U.S.C. 154(b) by 88 days.

(21) Appl. No.: 10/047,330

(22) Filed: Jan. 14, 2002

(65) Prior Publication Data

US 2003/0132365 A1 Jul. 17, 2003

(51) Int. Cl.⁷ .................................................. H01J 3/00
(52) U.S. Cl. ..................................... 250/216; 250/208.1
(58) Field of Search .............................. 250/216, 358.1, 250/208.1, 201.5; 358/457; 382/295; 355/53

(56) References Cited

U.S. PATENT DOCUMENTS

| | | |
|---|---|---|
| 4,750,022 A | 6/1988 | Araki ........................ 355/46 |
| 4,987,496 A * | 1/1991 | Greivenkamp, Jr. ........ 358/448 |
| 5,051,770 A | 9/1991 | Cornuejols ................. 354/432 |
| H001060 H | 5/1992 | Lazich |
| 5,198,653 A | 3/1993 | Shen et al. |
| 5,204,770 A | 4/1993 | Kachru et al. |
| 5,291,008 A | 3/1994 | Havens et al. |
| 5,430,807 A * | 7/1995 | Gravely |
| 5,559,629 A | 9/1996 | Sheets et al. .............. 359/364 |
| 5,666,202 A * | 9/1997 | Kyrazis ...................... 356/614 |
| 5,710,430 A * | 1/1998 | Nuss |
| 5,719,620 A * | 2/1998 | Allio |
| 5,737,084 A * | 4/1998 | Ishihara |
| 5,757,425 A * | 5/1998 | Barton et al. |
| 5,760,398 A * | 6/1998 | Blackwell et al. |
| 5,876,327 A * | 3/1999 | Tsuyuki et al. |
| 5,973,844 A | 10/1999 | Burger |
| 6,005,916 A | 12/1999 | Johnson et al. ............ 378/87 |
| 6,008,945 A | 12/1999 | Fergason ................... 359/630 |
| 6,020,988 A * | 2/2000 | Deliwala et al. |
| 6,069,651 A * | 5/2000 | Tsuyuki et al. ............. 348/75 |
| 6,078,390 A | 6/2000 | Bengtsson |
| 6,088,097 A | 7/2000 | Uhl ............................ 356/318 |
| 6,124,974 A | 9/2000 | Burger ....................... 359/621 |
| 6,128,068 A | 10/2000 | Suzuki et al. .............. 355/53 |
| 6,178,346 B1 * | 1/2001 | Amundson et al. |
| 6,195,213 B1 | 2/2001 | Omura et al. .............. 359/727 |
| 6,248,988 B1 | 6/2001 | Krantz |
| 6,249,360 B1 * | 6/2001 | Pollard et al. |
| 6,268,918 B1 * | 7/2001 | Tanabe et al. |
| 6,285,811 B1 * | 9/2001 | Aggarwal et al. |
| 6,344,893 B1 | 2/2002 | Mendlovic et al. |
| 6,385,352 B1 * | 5/2002 | Roustaei .................... 382/324 |
| 6,522,412 B2 * | 2/2003 | Norita et al. .............. 356/601 |
| 6,529,614 B1 * | 3/2003 | Chao et al. ................ 382/103 |
| 6,593,559 B2 * | 7/2003 | Yamakawa ................ 250/208.1 |
| 2002/0110320 A1 * | 8/2002 | Carlisle et al. |
| 2002/0126591 A1 * | 9/2002 | Takamine et al. |
| 2002/0162973 A1 * | 11/2002 | Cordingley et al. |

FOREIGN PATENT DOCUMENTS

EP 000534768 * 3/1993

OTHER PUBLICATIONS

Holst, Gerald C., "Image Quality: Does Your Detector Match Your Optics? Understanding the term "resolution" for both optics and detectors provides a solid basis for designing imaging systems." Photonics Spectra, Jan. 1999, pp. 144–146.

(List continued on next page.)

Primary Examiner—Gail Verbitsky
(74) Attorney, Agent, or Firm—Amin & Turocy, LLP (57) ABSTRACT

An imaging system and methodology is provided to facilitate optical imaging performance. The system includes a sensor and a lens system, including one or more lenses, configured according to sensor characteristics to facilitate scaling parts of the sensor to an object field of view so as to provide desired resolution of an object being viewed.

22 Claims, 4 Drawing Sheets

OTHER PUBLICATIONS

Casasesnt, David, *"Performing Image Analysis With Optical Pattern Recognition,"* The Photonics Design and Applications Handbook, 1998, pp. 158–161.

Mukundakrishnan, Bharath, *"Design for Visually Servoed Microassembly,"* Advanced Microsystems Laboratory, Department of Mechanical Engineering, University of Minnesota 2000.

*"Using your microscope, high magnifications with an oil–immersion objective,"* riberuet. 1999–2000.

Melles Griot, Optical Systems, Machine Vision Product Guide, USA, 1998.

International Search Report dated Nov. 12, 2002 in PCT Application No. PCT/US02/21392 filed Jul. 3, 2002.

\* cited by examiner

|  | 750 x – 1500 x nominal Effective Magnification | 1500x – 2500 x nominal Effective Magnification | 2500x – 5000 x nominal Effective Magnification |
|---|---|---|---|
| *Effective Resolved Magnification* | | | |
| *Working Distance (mm)* | 13.0 mm DRY space | 5.0 mm DRY space | 0.5 mm DRY space |
| *Absolute Spatial Resolution (nanometers)* | 800 nm typical - | 400 nm typical - | 200 nm typical - |
| *Spatial Field Of View (mm)* | 1.00 mm | 0.500 mm | 0.250 mm |
| *Conventional Objective employed* | 10 x DRY | 20 x DRY | 40 x DRY |
| *Eyepiece (view or photographic)* | NOT EMPLOYED (DIGITAL DISPLAY) | NOT EMPLOYED (DIGITAL DISPLAY) | NOT EMPLOYED (DIGITAL DISPLAY) |
| *Depth Of Field (microns - µ)* | 16 µ - | 6.25 µ - | 2.5 µ - |
| *Absolute Spatial Resolution per Pixel at Sensor (nanometers)* | 800 nm typical - | 400 nm typical - | 200 nm typical - |

Fig. 4

OPTICAL SYSTEM AND METHOD OF MAKING SAME

RELATED APPLICATION

This application is related to U.S. patent application Ser. No. 09/900,218, which was filed Jul. 6, 2001, and entitled IMAGING SYSTEM AND METHODOLOGY EMPLOYING RECIPROCAL SPACE OPTICAL DESIGN.

TECHNICAL FIELD

The present invention relates generally to image and optical systems, and more particularly to an optical system and to a method of making same.

BACKGROUND OF THE INVENTION

Optical technologies and sciences have evolved from ancient observations and understandings of the nature of light to the manner in which light can be manipulated via one or more optical devices, such as through a lens or a combination of lenses. One characteristic usually important in optical technologies relates to resolution of an object. Resolution can be defined as the ability of an optical device to distinguish between small objects. In most conventional lens and imaging systems, resolution generally depends on a numerical aperture of a lens.

The numerical aperture is a parameter of a lens objective corresponding to its ability to gather light and resolve fine specimen detail at a fixed object distance. The numerical aperture is functionally related to the index of refraction of the imaging medium. For example, air has a refractive index of about 1.0. Thus, the refractive index of the imaging medium is a limiting factor in achieving numerical apertures greater than 1.0. Therefore, in order to obtain higher working numerical apertures, and, in turn, improved resolution, the refractive index of the medium between the front lens of the objective and the specimen can be increased to above 1.0 (e.g., to about 1.5). In order to increase the numerical aperture, oil immersion techniques have been developed, which require a physical image medium (e.g., water, glycerin, immersion oil, etc.) other than air.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention relates to an optical system that includes an optical sensor having an array of light receptors having a pixel pitch. A lens optically associated with the optical sensor is configured with optical parameters functionally related to the pitch and a desired resolution of the optical system. As a result, the lens is operative to substantially map a portion of an object having the desired resolution along the optical path to an associated one of the light receptors.

Another aspect of the present invention relates to a method of designing an optical system. The method includes selecting a sensor with a plurality of light receptors having a pixel pitch. A desired minimum spot size resolution is selected for the system and a lens configured with optical parameters based on the pixel pitch and the desired minimum spot size is provided so as to map the plurality of light receptors to part of the image according to the desired resolution.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
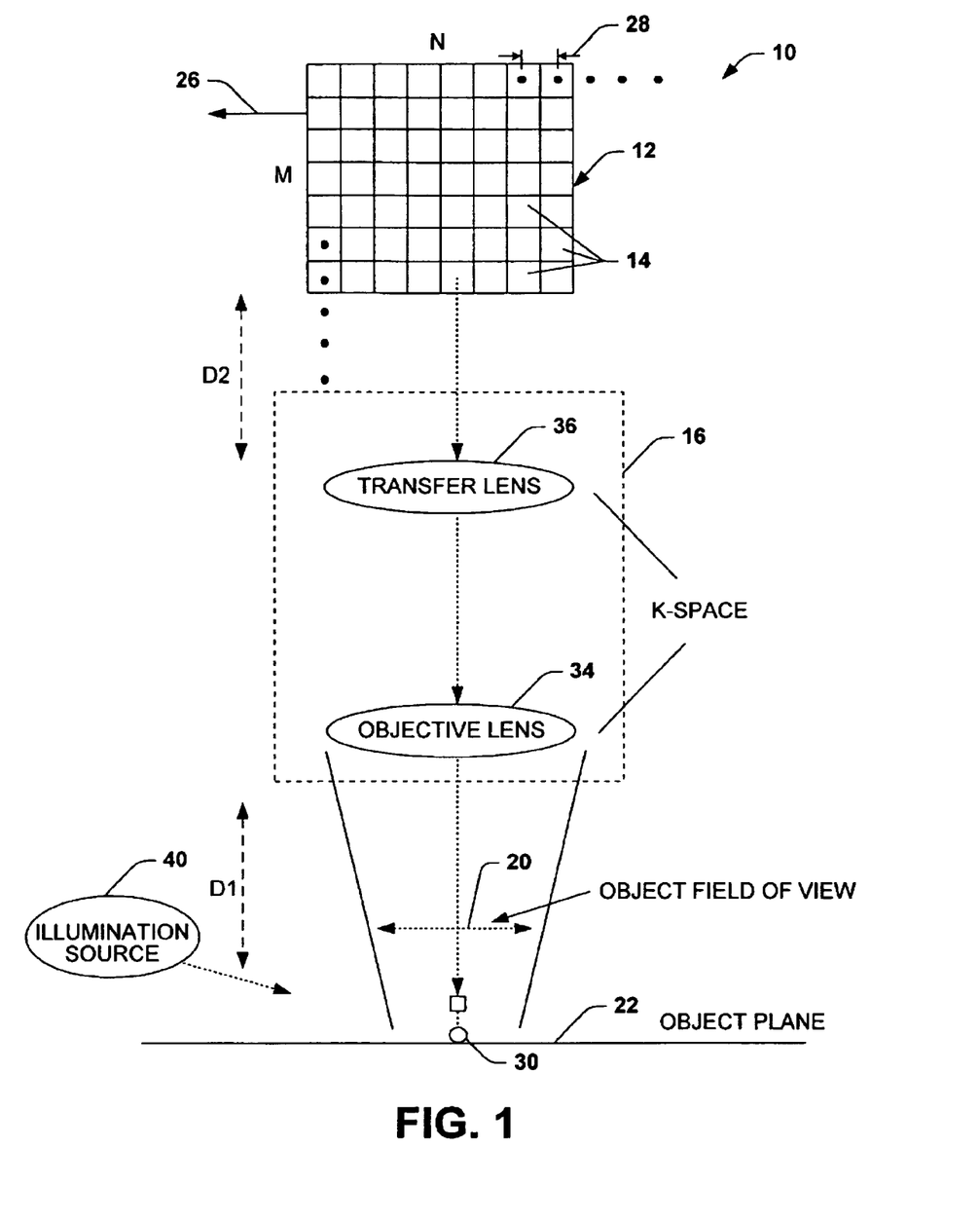
FIG. 1 is a schematic block diagram illustrating an optical system in accordance with an aspect of the present invention.

FIG. 1 illustrates an optical system 10 in accordance with an aspect of the present invention. The system 10 includes a sensor 12 having a plurality of receptors or sensor pixels 14. For example, the sensor 12 is an M by N array of sensor pixels 14, having M rows and N columns (e.g., 640×480, 512×512, 1024×1280, etc.), M and N being integers respectively. Although a rectangular sensor 12 having generally square pixels is depicted, it is to be understood and appreciated that the sensor can be substantially any shape (e.g., circular, elliptical, hexagonal, rectangular, etc.). It is to be further appreciated that respective pixels 14 within the array can also be substantially any shape or size in accordance with an aspect of the present invention.

The sensor 12 can be substantially technology (e.g., digital sensor, analog sensor, Charge Coupled Device (CCD) sensor, CMOS sensor, Charge Injection Device (CID) sensor, an array sensor, a linear scan sensor) including one or more receptors (or pixels) 14. According to one aspect of the present invention, each of the pixels 14 is similarly sized or proportioned and responsive to light (e.g., visible, non-visible) received from the items under examination, as described herein.

The sensor 12 is associated with a lens network 16, which is configured based on performance requirements of the optical system and the pitch size of sensor 12. The lens network 16 is operative to scale (or project) proportions (e.g., pixels 14) of the sensor 12 at an image plane established by the position of the sensor 12 to an object field of view 20 in accordance with an aspect of the present invention. The object field of view 20 is related to the position of an object plane 22 that includes one or more items (not shown) under examination.

As the sensor 12 receives light from the object field of view 20, the sensor 12 provides an output 26 that can be directed to a local or remote storage such as a memory (not shown) and displayed from the memory via a computer and associated display, for example, without substantially any intervening digital processing (e.g., straight bit map from sensor memory to display), if desired. It is noted that local or remote signal processing of the image data received from the sensor 12 can also occur. For example, the output 26 can be converted to electronic data packets and transmitted to a remote system over a network for further analysis and/or display. Similarly, the output 26 can be stored in a local computer memory before being transmitted to a subsequent computing system for further analysis and/or display.

The scaling (or effective projecting) of pixels 14 provided by the lens network 16 is determined by a novel k-space configuration or design in accordance with an aspect of the present invention. The k-space design of the lens network 16 promotes predetermined k-space frequencies of interest and mitigates frequencies outside the predetermined frequencies. This has the effect of a band-pass filter of the spatial frequencies within the lens network 16 and notably defines the imaging system 10 in terms of resolution rather than magnification. As will be described below, the resolution of the imaging system 10 determined by the k-space design promotes a plurality of features in a displayed or stored image, such as having high "Effective Resolved Magnification" (a figure of merit described in following), high spatial resolution, large depth of field, larger working distances, and a unitary Modulation Transfer Function as well as other features.

In order to determine the k-space frequencies, a "pitch" or spacing 28 is determined between adjacent receptors 14 on the sensor 12. The pitch (e.g., pixel pitch) corresponds to the center-to-center distance of adjacent receptors, indicated at 28, which is about the size or diameter of a single receptor when the sensor includes all equally sized pixels. The pitch 28 defines the Nyquist "cut-off" frequency band of the sensor 12. It is this frequency band that is promoted by the k-space design, whereas other frequencies are mitigated. In order to illustrate how scaling is determined in the imaging system 10, a point 30 of a desired smallest resolvable spot size is illustrated at the object plane 22. The point 30, for example, can represent the smallest resolvable object determined by optical characteristics of the lens network 16. That is, the lens network is configured to have optical characteristics (e.g., magnification, numerical aperture) so that each pixel 14 is matched or scaled to be about the same size in the object field of view 20 as the desired minimum resolvable spot size of the point 30. For purposes of illustration, a scaled receptor 32 is depicted in front of the field of view 20 as having a size determined according to the pitch 28 of the sensor 12, which is about the same as the point 30.

By way of illustration, the lens network 16 is designed to effectively reduce the size of each given receptor (e.g., pixel) 14 at the sensor 12 to be about the same size (e.g., matched in size) to the size of the point 30, which is the minimum spot size resolvable by the system 10. It is to be understood and appreciated that the point 30 can be selected to a size representing the smallest resolvable object determined by optical characteristics within the lens network 16 as determined by diffraction rules (e.g., diffraction limited spot size). The lens network 16 thus can be designed to effectively scale each pixel 14 of the sensor 12 to any size that is equal to or greater than the diffraction limited size. For example, the resolvable spot size can be selected to provide for any desired image resolution that meets such criteria.

After the desired resolution (resolvable spot size) is selected, the lens network 16 is designed to provide the magnification to scale the pixels 14 to the object field of view 20 accordingly. This has the effect of filling the object field of view 20 with substantially all of the receptors of the sensor 12, the respective receptors being suitably scaled to be similar in size to the point 30, which corresponds to the desired resolvable spot size. The matching/mapping of sensor characteristics to the desired (e.g., smallest) resolvable object or point 30 within the object field of view 20 defines the imaging system 10 in terms of absolute spatial resolution and profoundly enhances the operating performance of the system in accordance with an aspect of the present invention.

By way of further illustration, in order to provide unit-mapping according to this example, assume that the sensor array 12 provides a pixel pitch 28 of about 10.0 microns. The lens network 16 includes an objective lens 34 and a secondary lens 36. For example, the objective lens 34 can be set at infinite conjugate to the secondary lens 36, with the spacing between the objective and secondary lenses being flexible. The lenses 34 and 36 are related to each other so as to achieve a reduction from sensor space defined at the sensor array 20 to object space defined at the object plane 22. It is noted that substantially all of the pixels 14 are projected into the object field of view 20, which is defined by the objective lens 34. For example, the respective pixels 14 are scaled through the objective lens 34 to about the dimensions of the desired minimum resolvable spot size. In this example, the desired resolution at the image plane 22 is one micron. Thus, a magnification of ten times is operative to back project a ten micron pixel to the object plane 22 and reduce it to a size of one micron.

The reduction in size of the array 12 and associated pixels 14 can be achieved by selecting the transfer lens 36 to have a focal length "D2" (from the array 12 to the transfer lens 36) of about 150 millimeters and by selecting the objective lens to have a focal length "D1" (from the objective lens 36 to the object plane 22) of about 15 millimeters, for example. In this manner, the pixels 14 are effectively reduced in size to about 1.0 micron per pixel, thus matching the size of the of the desired resolvable spot 30 and filling the object field of view 20 with a "virtually-reduced" array of pixels. It is to be understood and appreciated that other arrangements of one or more lenses can be employed to provide the desired magnification.

In view of the foregoing description, those skilled in the art will understand and appreciate that the optical media (e.g., lens network 16) can be designed, in accordance with an aspect of the present invention, with standard, relatively inexpensive "off-the-shelf" components having a configuration that defines that the object and image space are "unit-mapped" or "unit-matched" for substantially all image and object fields. The lens network 16 and, in particular the objective lens 34, performs a Fourier transform of an object and an image in k-space (also referred to as "reciprocal-space"). It is this transform that is operated on for image optimization by the k-space design of the present invention.

A small Blur-circle or airy disk at the object plane is defined by the design to match the pixels in the image plane (e.g., at the image sensor of choice) with substantially one-to-one correspondence with the airy disk and thus the Fourier transforms of pixilated arrays can be matched. This implies that, optically by design, the airy disk is scaled through the lens network 16 to be about the same size as the receptor or pixel pitch. As mentioned above, the lens network 16 is defined so as to construct an Intrinsic Spatial Filter (e.g., a k-space filter). Such a design definition and implementation enables the spectral components of both the object and the image in k-space to be about the same or quantized. This also defines that a Modulation Transfer Function (MTF) (the comparison of contrast to spatial resolution) of the sensor can be matched to the MTF of the object Plane in accordance with an aspect of the present invention.

As illustrated in FIG. 1, k-space is defined as the region between the objective lens 34 and the secondary lens 36. It is to be appreciated that substantially any optical media, lens type and/or lens combination that reduces, maps and/or projects the sensor array 12 to the object field of view 20 in accordance with unit or k-space mapping as described herein is within the scope of the present invention.

To illustrate the novelty of the exemplary lens/sensor combination depicted in FIG. 1, it is noted that conventional objective lenses, sized according to conventional geometric paraxial ray techniques, are generally sized according to the magnification, Numeric Aperture, focal length and other parameters provided by the objective. Thus, the objective lens would be sized with a greater focal length than subsequent lenses that approach or are closer to the sensor (or eyepiece in conventional microscope) in order to provide magnification of small objects. This can result in magnification of the small objects at the object plane being projected as a magnified image of the objects across "portions" of the sensor and results in known detail blur (e.g., Rayleigh diffraction and other limitations in the optics), empty magnification problems, and Nyquist aliasing among other problems at the sensor. The k-space design of the present invention operates in a manner not consistent with conventional geometrical paraxial ray design principles. That is, the objective lens 34 and the secondary lens 36 operate to provide a reduction in size of the sensor array 12 to the object field of view 20, as demonstrated by the relationship of the lenses.

An illumination source 40 can be provided with the present invention in order that photons can be emitted from objects in the field of view 34 to enable activation of the receptors in the sensor 12. It is noted that the present invention can potentially be employed without an illumination source 40 if potential self-luminous objects (e.g., biological specimens such as a firefly and other objects or specimens with emissive characteristics) emit enough radiation to activate the sensor 12. It has been observed that Light Emitting Diodes provide an effective illumination source 40 in accordance with the present invention. Substantially any illumination source 40 can be applied including coherent and non-coherent sources, visible and non-visible wavelengths. However, for non-visible wavelength sources, the sensor 12 would also be suitably adapted. For example, for an infrared or ultraviolet source, an infrared or ultraviolet sensor 12 would be employed, respectively. Other suitable illumination sources 40 can include wavelength-specific lighting, broad-band lighting, continuous lighting, strobed lighting, Kohler illumination, Abbe illumination, phase-contrast illumination, darkfield illumination, brightfield illumination, Epi illumination, and the like. Transmissive or reflective (both specular and diffuse) lighting techniques can also be applied.

Figure 2:
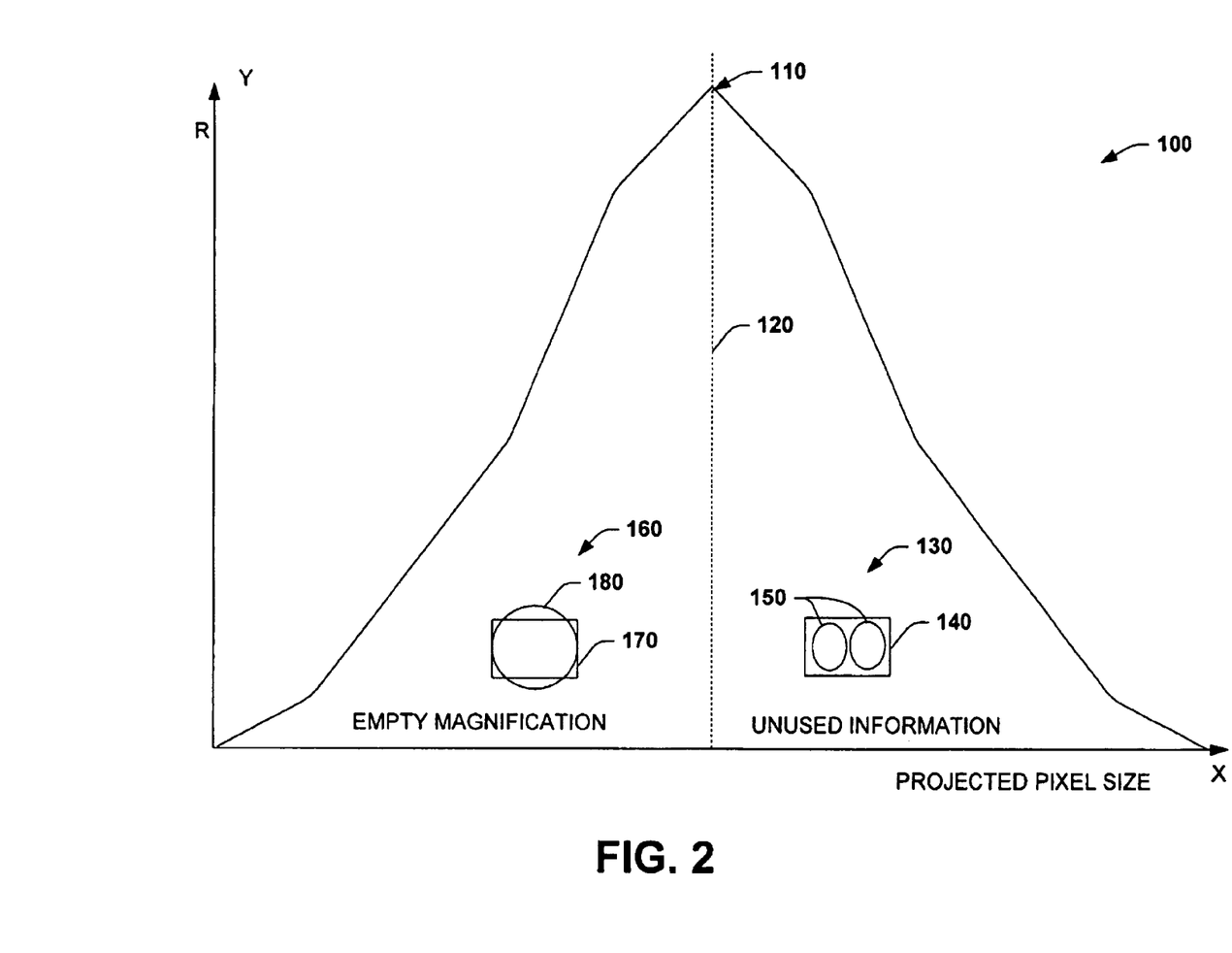
FIG. 2 is a graph illustrating sensor matching considerations in accordance with an aspect of the present invention.

FIG. 2 illustrates a graph 100 of mapping characteristics and comparison between projected pixel size on the X-axis and diffraction-limited spot resolution size "R" on the Y-axis. An apex 110 of the graph 100 corresponds to unit mapping between projected pixel size and the diffraction limited spot size, which represents an optimum relationship between a lens network and a sensor in accordance with the present invention.

It is to be appreciated that the objective lens 34 (FIG. 1) should generally not be selected such that the diffraction-limited size "R" of the smallest resolvable objects are smaller than a projected pixel size. If so, "economic waste" can occur wherein more precise information is lost (e.g., selecting an object lens more expensive than required, such as having a higher numerical aperture). This is illustrated to the right of a dividing line 120 at reference 130 depicting a projected pixel 140 larger that two smaller diffraction spots 150. In contrast, where an objective is selected with diffraction-limited performance larger than the projected pixel size, blurring and empty magnification can occur. This is illustrated to the left of line 120 at reference numeral 160, wherein a projected pixel 170 is smaller than a diffraction-limited object 180. It is to be appreciated, however, that even if substantially one-to-one correspondence is not achieved between projected pixel size and the diffraction-limited spot, a system can be configured with less than optimum matching (e.g., 0.1%, 1%, 2%, 5%, 20%, 95% down from the apex 110 on the graph 100 to the left or right of the line 320) and still provide suitable performance in accordance with an aspect of the present invention. Thus, less than optimal matching is intended to fall within the spirit and the scope of present invention.

It is further to be appreciated that the diameter of the lenses in the system as illustrated in FIG. 1, for example, should be sized such that when a Fourier Transform is performed from object space to sensor space, spatial frequencies of interest that are in the band pass region described above (e.g., frequencies utilized to define the size and shape of a pixel) are substantially not attenuated. This generally implies that larger diameter lenses (e.g., about 10 to 100 millimeters) should be selected to mitigate attenuation of the spatial frequencies of interest.

Figure 3:
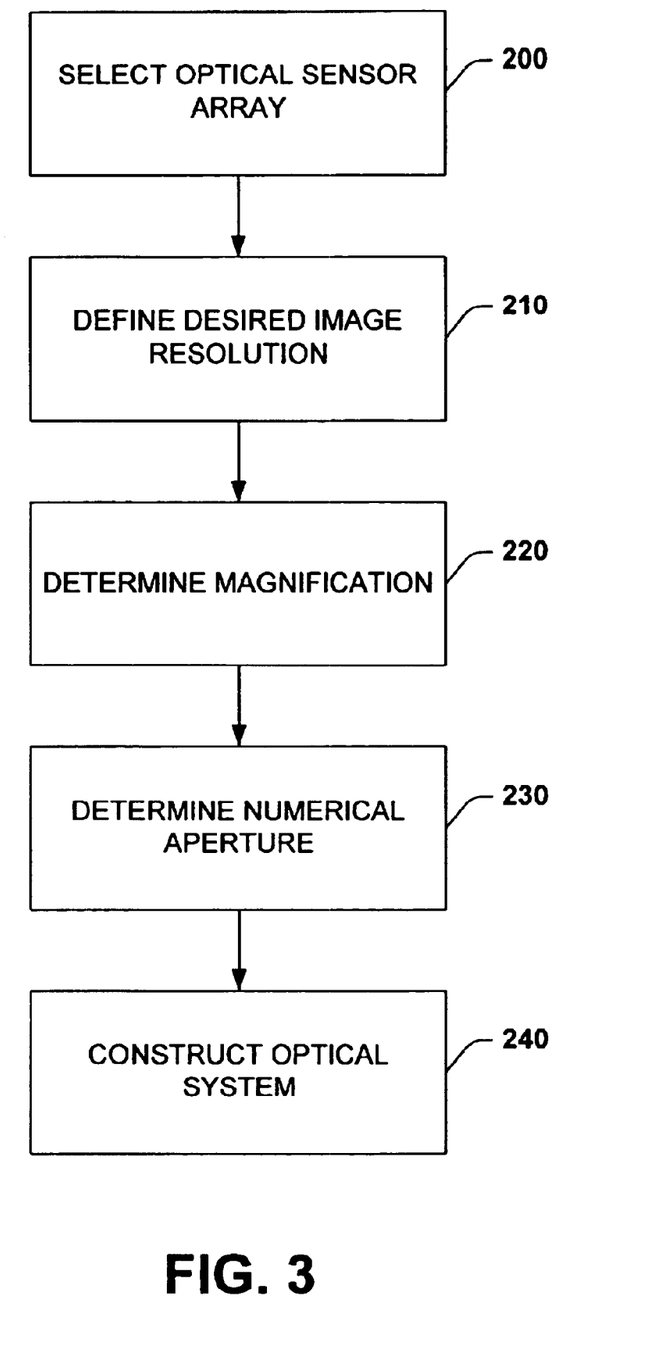
FIG. 3 is a flow diagram illustrating an imaging methodology in accordance with an aspect of the present invention.

FIG. 3 illustrates a methodology that can be employed to design an optical/imaging system in accordance with an aspect of the present invention. The methodology begins at 200 in which an appropriate sensor array is chosen for the system. The sensor array includes of a matrix of receptor pixels having a known pitch size, usually defined by the manufacturer. The sensor can be substantially any shape (e.g., rectangular, circular, square, triangular, and so forth). By way of illustration, assume that a simple sensor of 640×480 pixels having a pitch size of 10 $\mu$m is chosen. It is to be understood and appreciated that an optical system can be designed for any type and/or size of sensor array in accordance with an aspect of the present invention.

Next at 210, an image resolution is defined. The image resolution corresponds to the smallest desired resolvable spot size at the image plane. The image resolution can be defined based on the application(s) for which the optical system is being designed, such as any resolution that is greater than or equal to a smallest diffraction limited size. Thus, it is to be appreciated that resolution becomes a selectable design parameter that can be tailored to provide desired image resolution for virtually any type of application. In contrast, most conventional systems tend to limit resolution according to Rayleigh diffraction, which provides that intrinsic spatial resolution of the lenses cannot exceed limits of diffraction for a given wavelength.

After selecting a desired resolution (210), an appropriate amount of magnification is determined at 220 to achieve such resolution. For example, the magnification is functionally related to the pixel pitch of the sensor array and the smallest resolvable spot size. The magnification (M) can be expressed as follows:

$$M = \frac{x}{y} \qquad \text{Eq. 1}$$

where: x is the pixel pitch of the sensor array; and
y is the desired image resolution (minimum spot size).

So, for the above example where the pixel pitch is 10 μm and assuming a desired image resolution of 1 μm, Eq. 1 provides an optical system of power ten. That is, the lens system is configured to back-project each 10 μm pixel to the object plane and reduce respective pixels to the resolvable spot size of 1 micron.

The methodology of FIG. 3 also includes a determination of a Numerical Aperture at 230. The Numerical Aperture (NA) is determined according to well established diffraction rules that relate NA of the objective lens to the minimum resolvable spot size determined at 210 for the optical system. By way of example, the calculation of NA can be based on the following equation:

$$NA = \frac{0.5 \times \lambda}{y} \qquad \text{Eq. 2}$$

where: λ is the wavelength of light being used in the optical system; and y is the minimum spot size (e.g., determined at 210).

Continuing with the example in which the optical system has a resolved spot size of y=1 micron, and assuming a wavelength of about 500 nm (e.g., green light), a NA=0.25 satisfies Eq. 2. It is noted that relatively inexpensive commercially available objectives of power 10 provide numerical apertures of 0.25.

It is to be understood and appreciated that the relationship between NA, wavelength and resolution represented by Eq. 2 can be expressed in different ways according to various factors that account for the behavior of objectives and condensers. Thus, the determination at 230, in accordance with an aspect of the present invention, is not limited to any particular equation but instead simply obeys known general physical laws in which NA is functionally related to the wavelength and resolution. After the lens parameters have been designed according to the selected sensor (200), the corresponding optical components can be arranged to provide an optical system (240) in accordance with an aspect of the present invention.

Assume, for purposes of illustration, that the example optical system created according to the methodology of FIG. 3 is to be used for microscopy. By way of comparison, in classical microscopy, in order to image structures of a size approaching 1 micron (and below), magnifications of many hundreds usually are required. The basic reason for this is that such optics conventionally have been designed for the situation when the sensor of choice is the human eye. In contrast, the methodology of FIG. 3 designs the optical system around the sensor, which affords significant performance increases at reduced cost.

In the k-space design methodology, according to an aspect of the present invention, the optical system is designed around a discrete sensor that has known fixed dimensions. As a result, the methodology provides a far more straightforward optical system design approach to "back-project" the sensor size onto the object plane and calculate a magnification factor. A second part of the methodology helps ensure that the optics that provide the magnification have a sufficient NA to optically resolve a spot of the same dimensions as the back-projected pixel. Advantageously, an optical system designed in accordance with an aspect of the present invention can utilize custom and/or off-the-shelf components. Thus, for this example, inexpensive optics can be employed in accordance with an aspect of the present invention to obtain excellent results, but well-corrected microscope optics are relatively cheap. If custom-designed optics are utilized, in accordance with an aspect of the present invention, then the range of permissible magnifications and numerical apertures becomes immense, and some performance gains can be realized over the use of off-the-shelf optical components.

Figure 4:
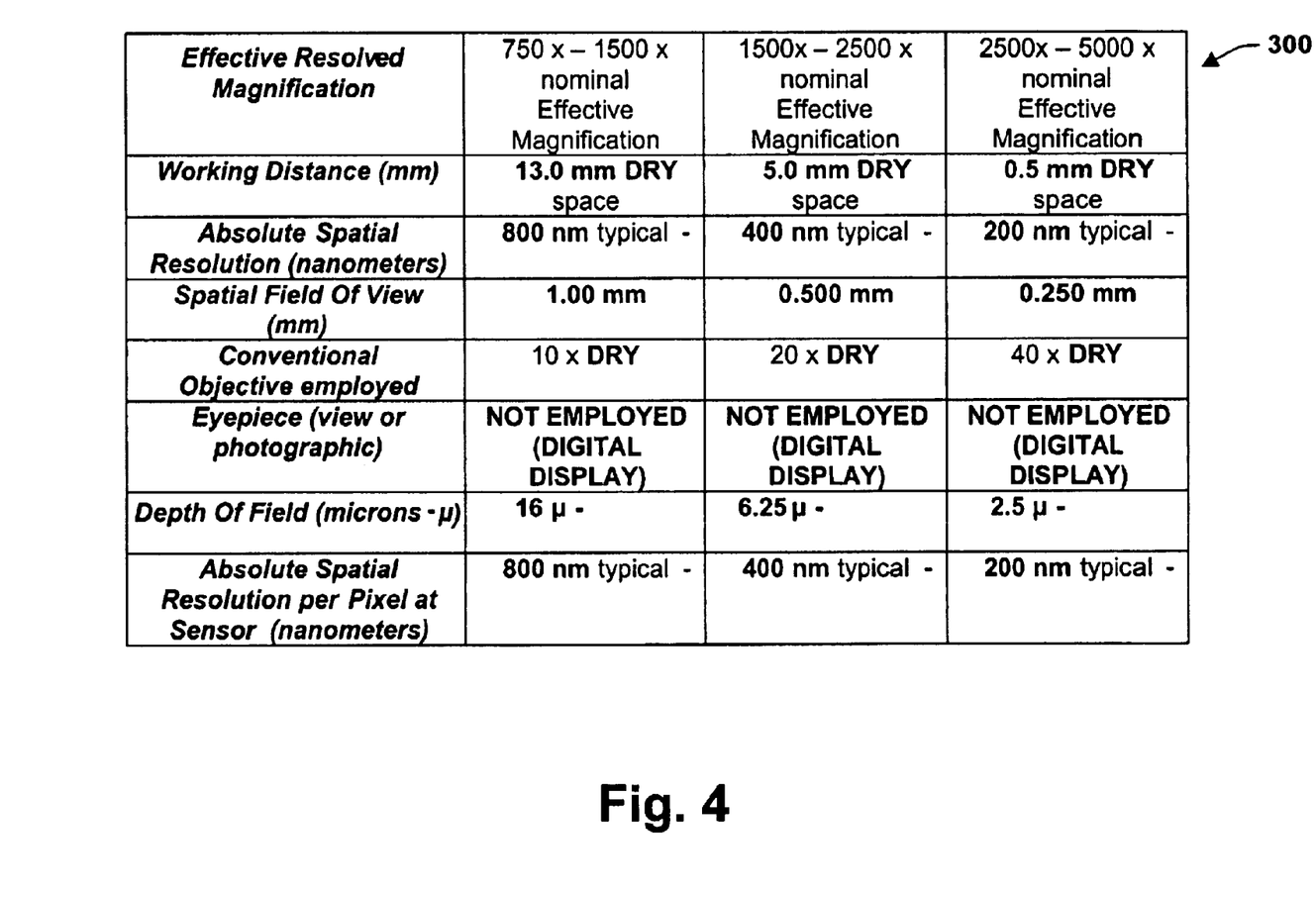
FIG. 4 is a chart illustrating exemplary performance specifications in accordance with an aspect of the present invention.

FIG. 4 illustrates a chart 300 of exemplary and typical performance parameters that can be achieved via the k-space design of the present invention employing standard, low-cost, and commercially available components such as dry objective lenses, a 1024×1280 sensor, LED illumination source wavelengths selected at about twice the wavelength of the desired resolution (e.g., for 200 nanometer resolution, 400 nanometer light source selected), and a straight bit map from sensor to image display without intervening signal processing. As can be observed, Effective Resolved Magnifications up to about 5000 times can be achieved at a resolution of about 200 nanometers in a typical non-optimized system. As used herein, the term "Effective Resolved Magnification" is utilized to objectively compare the relative apparent image size and Absolute Spatial Resolution of the present invention with conventional microscopic imaging systems. It is to be appreciated that the actual useful depth of field that can be achieved, in accordance with an aspect of the present invention, can be better than the conservative numbers shown in FIG. 4.

In view of the concepts described above in relation to FIGS. 1–4, a plurality of related imaging applications can be enabled and enhanced by employing an optical/imaging system constructed in accordance with an aspect of the present invention. For example, these applications can include but are not limited to imaging, control, inspection, microscopy and/or other analysis such as:

(1) Bio-medical analysis (e.g., cell colony counting, histology, frozen sections, cellular cytology, cellular micro-dissection, Hematology, pathology, oncology, fluorescence, interference, phase and many other clinical microscopy applications);

(2) Particle Sizing Applications (e.g., Pharmaceutical manufacturers, paint manufacturers, cosmetics manufacturers, food process engineering, and others);

(3) Air quality monitoring and airborne particulate measurement (e.g., clean room certification, environmental certification, and so forth);

(4) Optical defect analysis, and other requirements for high resolution microscopic inspection of both transmissive and opaque materials (as in metallurgy, semiconductor inspection and analysis, vision systems and so forth); and (5) Imaging technologies such as cameras, copiers, FAX machines and medical systems.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An optical system, comprising:

an optical sensor having an array of light receptors having a pixel pitch; and a lens optically associated with the optical sensor along an optical path, the lens having a diffraction limited spot size and configured with optical parameters functionally related to the pixel pitch and a desired resolution of the optical system, such that the lens is operative to substantially map a portion of the diffraction limited spot size to an associated one of the light receptors, the lens comprising a numerical aperture to be functionally related to a ratio of a wavelength of light employed to illuminate an object and the desired resolution, the numerical aperture (NA) being computed according to the expression: $NA = (0.5 \times \lambda)/y$, where $\lambda$ is the wavelength of light and y is the pixel pitch.

2. The system of claim 1, the optical parameters including a magnification functionally related to a ratio of the desired resolution and the pixel pitch.

3. The system of claim 1, the sensor further comprising at least one of a CMOS sensor and a Charge Injection Device (CID) sensor.

4. The system of claim 1, the desired resolution being at least equal to a diffraction limited spot size.

5. The system of claim 1, the optical parameters including a magnification of the lens.

6. The system of claim 5, the magnification being functionally related to a ratio of the desired resolution and the pixel pitch.

7. The system of claim 1, the lens further comprising at least one of an aspherical lens, a multiple lens configuration, a fiber optic taper, an image conduit, and a holographic optic element.

8. The system of claim 7, the lens further comprising a plurality of lenses comprising a first lens positioned toward the object field of view and a second lens positioned toward the sensor, the first lens having a focal length that is smaller than the second lens.

9. The system of claim 1, the sensor further comprising at least one of a digital sensor, an analog sensor, a Charge Coupled Device (CCD) sensor, a CMOS sensor, a Charge Injection Device (CID) sensor, an array sensor, and a linear scan sensor.

10. The system of claim 1, further comprising an illumination source to illuminate the object.

11. The system of claim 10, the illumination source further comprises a Light Emitting Diode.

12. The system of claim 10, the illumination source further providing at least one of coherent light, non-coherent light, visible light and non-visible light, the sensor being configured to sense the light from the illumination source.

13. The system of claim 1, the optical parameter comprising a numerical aperture of the lens, the numerical aperture being functionally related to a ratio of a wavelength of light employed to illuminate an object and the desired image resolution.

14. A method of designing an optical system, comprising:
    selecting a sensor with a plurality of light receptors having a pixel pitch;
    selecting a desired minimum spot size resolution for the system; and
    providing a lens configured with optical parameters based on the pixel pitch and the desired minimum spot size;
    computing a magnification for the lens to be functionally related to a ratio of the desired resolution and the pixel pitch; and
    computing a numerical aperture to be functionally related to a ratio of a wavelength of light employed to illuminate an object and the desired resolution.

15. The method of claim 14, further comprising selecting the lens to have a magnification functionally related to a ratio of the desired resolution and the pixel pitch and selecting a sensor from the group consisting of a digital sensor, an analog sensor, a Charge Coupled Device (CCD) sensor, a CMOS sensor, a Charge Injection Device (CID) sensor, an array sensor, and a linear scan sensor.

16. The method of claim 15, the optical parameter comprising a numerical aperture of the lens, the numerical aperture being functionally related to a ratio of a wavelength of light employed to illuminate an object and the desired resolution.

17. The method of claim 14, the desired resolution being greater than or equal to a diffraction limited size functionally related to a wavelength of light that illuminates the object and which the sensor is operative to sense.

18. A method of designing an optical system, comprising:
    providing a sensor array operative to sense light and provide a sensor signal having an electrical characteristic indicative thereof, the sensor array comprising a plurality of light receptors arranged along a surface thereof according to pixel pitch, the sensor comprising at least one of a CMOS sensor and a Charge Injection Device (CID) sensor;
    selecting a desired resolution for the optical system that is greater than or equal to a diffraction limited spot size;
    computing a magnification for at least one lens as a function of the desired resolution and the pixel pitch; and
    computing a numerical aperture for the at least one lens as a function of at least one wavelength of light for use in illuminating an object and the desired resolution,
    the numerical aperture (NA) being computed according to the expression:
    $NA = (0.5 \times \lambda)/y$, where $\lambda$ is the wavelength of light and y is the pixel pitch.

19. The method of claim 18, further comprising manufacturing an optical system according to the method of claim 19.

20. An optical system, comprising:
    an optical sensor having an array of receptors, the receptors having a pixel pitch; and
    a lens optically associated with the optical sensor along an optical path, the lens having a diffraction limited spot size functionally related to the pixel pitch and a desired image resolution of the optical system, such that the lens is configured to scale the pixel pitch of the receptors within 20% of a diffraction limited spot size of the lens, the lens comprising a numerical aperture to be functionally related to a ratio of a wavelength of light employed to illuminate an object and the desired image resolution, the numerical aperture (NA) being computed according to the expression: $NA = (0.5 \times \lambda)/y$, where $\lambda$ is the wavelength of light and y is the pixel pitch.

21. The system of claim 20, the optical parameter comprising a numerical aperture of the lens, the numerical aperture being functionally related to a ratio of a wavelength of light employed to illuminate an object and the desired image resolution.

22. A method of designing an optical system, comprising:
    selecting a sensor with a plurality of light receptors having a pixel pitch;
    selecting a desired minimum spot size resolution for the system;
    providing a lens configured with optical parameters based on the pixel pitch and the desired minimum spot size;
    computing a magnification for the lens to be functionally related to a ratio of the desired resolution and the pixel pitch; and
    computing a numerical aperture to be functionally related to a ratio of a wavelength of light employed to illuminate an object and the desired resolution;
    the numerical aperture (NA) being computed according to the expression: $NA = (0.5 \times \lambda)/y$, where $\lambda$ is the wavelength of light and y is the pixel pitch.

* * * * *

UNITED STATES PATENT AND TRADEMARK OFFICE
CERTIFICATE OF CORRECTION

PATENT NO. : 6,815,659 B2
DATED : November 9, 2004
INVENTOR(S) : Andrew G. Cartlidge It is certified that error appears in the above-identified patent and that said Letters Patent is hereby corrected as shown below:

Title page,
Item [73], Assignee, please add the following:
    -- Himanshu S. Amin     Twinsburg, Ohio
    Daniel B. Bortnick     Mentor, Ohio
    Gregory Turocy     Westlake, Ohio --

Signed and Sealed this

Fifth Day of April, 2005

JON W. DUDAS
*Director of the United States Patent and Trademark Office*